United States Patent Office 3,829,483
Patented Aug. 13, 1974

3,829,483
PROCESS FOR THE PREPARATION OF
TRIFLUOROACETYL CHLORIDE
Peter-Paul Rammelt and Gunter Siegemund, Hofheim, Taunus, Germany, assignors to Farbwerke Hoechst Aktiengesellschaft vormals Meister Lucius & Bruning, Frankfurt am Main, Germany
No Drawing. Filed Jan. 22, 1973, Ser. No. 325,754
Claims priority, application Germany, Jan. 25, 1972,
P 22 03 326.7
Int. Cl. C07c 51/58, 53/20
U.S. Cl. 260—544 Y      6 Claims

ABSTRACT OF THE DISCLOSURE

The invention relates to a process for the preparation of trifluoroacetyl chloride by reacting trifluoroacetyl fluoride and chlorinated hydrocarbon, capable of being fluorinated, in the presence of hydrogen chloride and optionally of hydrogen fluoride by passing a gaseous mixture of said compounds over a chromium oxide catalyst and isolating the wanted trifluoroacetyl chloride.

---

The present invention relates to a process for the preparation of trifluoroacetyl chloride by reacting trifluoroacetyl fluoride in the presence of hydrogen chloride and optionally of hydrogen fluoride with a chlorinated hydrocarbon, capable of being fluorinated, in the gas phase using a chromium oxyfluoride catalyst at a temperature of 100 to 350° C.

It is known to obtain trifluoroacetyl chloride by reacting trifluoroacetic acid and benzoyl chloride (U.S. Pat. 2,257,868). The trifluoroacetic acid can be obtained, for example, by hydrolysis of trifluoroacetyl fluoride, which is prepared by electro fluorination of acetic acid or acetic anhydride in anhydrous hydrofluoric acid (Ind. Engng. Chem. 43, pp. 2332–2334 (1951)) or by catalytic fluorination of trichloroacetyl chloride (German Pat. 1,443,-837). Further, processes for the preparation of trifluoroacetyl chloride are known in which 2,2,2-trifluoro-di-chloroethane and hexafluoro-2,3-dichloro-butene-(2) are oxidized with oxygen under exposure to ultraviolet light. These oxydations are, however, troublesome and therefore uneconomical. Furthermore, they use as starting materials substances which are (highly toxic or) not easily accessible.

Great interest has been shown in finding a simple process for the preparation of trifluoroacetyl chloride since problems than the trifluoroacetyl fluoride. Added to this it is expected to present in its operation and further conversion—for example to dyestuffs—smaller corrosion problems than the trifluoroacetyl fluoride. Added to this is the fact that in the case of catalytic fluorination of trichloroacetyl chloride with hydrogen fluoride trifluoroacetylfluoride certainly is formed, in a good yield, however, together with large quantities of hydrogen chloride, from which it can only be separated with difficulty because of azeotrope formation. The catalytic process has furthermore the disadvantage that for a perfluorination of the trichloroacetyl chloride an excess of hydrogen fluoride is necessary in the range of from 20% to 50%, the subsequent separation and recovery of which presents considerable difficulties.

A process has now been found for the preparation of trifluoroacetyl chloride by reacting trifluoroacetyl fluoride in the presence of hydrogen chloride and optionally of hydrogen fluoride, wherein a gaseous mixture of trifluoroacetyl fluoride, chlorinated hydrocarbon, capable of being fluorinated, hydrogen chloride and optionally hydrogen fluoride is passed over a chromium oxyfluoride catalyst at a temperature of from 100 to 350° C. and the trifluoroacetyl chloride is isolated from the reaction mixture in the known way, preferably by fractionation.

It was found in particular that trifluoroacetyl chloride can be obtained from the reaction gases of the catalytic fluorination of trichloroacetyl chloride with hydrogen fluoride by mixing the crude fluorination mixture, which consists essentially of trifluoroacetyl fluoride, hydrogen chloride and the hydrogen fluoride used in excess, with a chlorinated hydrocarbon, capable of being fluorinated, by reacting the gaseous mixture at a temperature of from 100 to 350° C. at a chromium oxyfluoride catalyst and isolating the trifluoroacetyl chloride in the known way, preferably by fractionation.

As chlorinated hydrocarbons capable of being fluorinated those with 1 to 3 carbon atoms are used, in which at least 2 chlorine atoms are linked to at least one carbon atom. Carbon tetrachloride, chloroform, monofluorotrichloromethane and/or monofluorodichlormethane are preferred. The chlorohydrocarbon, capable of being fluorinated, is added to the gaseous mixture of trifluoroacetyl fluoride, hydrogen chloride and optionally hydrogen fluoride in quantities which correspond, measured in moles, to at least the same as half the sum, preferably the sum of the hydrogen fluoride and trifluoroacetyl fluoride contained in the gaseous mixture. An excess over the molar proportion is advantageous. This excess can be up to 5-fold, preferably between 0.5 and 3-fold, especially between 1 and 2-fold. Also an excess of more than 5-fold is possible, however this has no advantage but is a burden on the working up process.

The mixing of the crude fluorination mixture with the chlorinated hydrocarbon takes place in technically the known way, preferably for example without cooling of the crude fluorination mixture under previous evaporation of the chlorinated hydrocarbon and subsequent mixing of both gas streams.

The gaseous mixture obtained thus is then reacted at a fluorination catalyst obtained by fluorination of hydrated oxides of 3-valent chromium or by heating of hydrous chromium trifluoride in an oxygen or nitrogen stream. The reaction pressure applied can vary in a wide range between 0 and 9, preferably 1 and 6 atmospheres gage. The choice of the pressure is determined largely by the reaction pressure of the previous fluorination of the trichloroacetyl chloride and the chosen method of working up of the reaction mixture obtained according to the invention. If a working up purely by distillation with hydrogen chloride under reflux is chosen pressures of from 4 to 9 atmospheres gage are preferred. The preferred range of the reaction temperatures is 170 to 250° C.

The reaction mixture obtained contains, besides hydrogen chloride, only traces of trifluoroacetyl fluoride and hydrogen fluoride but on the other hand trifluoroacetyl chloride and fluorinated hydrocarbons or hydrocarbons capable of being fluorinated. The fluorinated chlorohydrocarbons are valuable products for the refrigeration and aerosol-technique. Since the small quantities of trifluoroacetyl fluoride still present pass over as an azeotrope with the hydrogen chloride, the trifluoroacetyl chloride, prepared according to the invention, can then be isolated by simple distillation or in the known way. The residue can be decomposed subsequently likewise in the known way into its components.

The trifluoroacetyl chloride obtained according to the invention is, as a result of its higher boiling point, an intermediate product which is easier to manage than the trifluoroacetyl fluoride. Especially advantageous is the fact that it develops no hydrogen fluoride when reacted, contrary to trifluoroacetyl fluoride, whereby problems pertaining to apparatus do not occur.

The following examples illustrate the invention.

Example 1

587 g. of trichloroacetyl chloride, 365 g. of hydrogen fluoride and 16 g. of chlorine were led in 6 hours in gaseous condition over a chromium oxyfluoride catalyst, prepared according to German Pat. No. 1,252,182. The catalyst was kept in a reaction vessel at a temperature of 240° C. and had a volume of 2 l. 1680 g. of carbon tetrachloride were added continuously in gaseous form to the reaction gases leaving the reaction vessel. This gaseous mixture was led at 220° C. again over a fluorination catalyst, as described above, which had a volume of 1 l., the reaction mixture obtained was condensed in cooling traps, which were cooled with Dry Ice or liquid air, and the fluid reaction products were rectified.

Thereby in the temperature interval of between −89° and −25° C. at the head and atmospheric pressure 10 g. of tetrafluoromethane,
    669 g. of hydrogen chloride together with
    31 g. of trifluorochloromethane and
    18 g. of trifluoroacetyl fluoride,
    431 g. of difluorodichloromethane were obtained;

between −25° and −12° C. at the head 308 g. of trifluoroacetyl chloride, corresponding to a yield of 73% of the theory were obtained.

As sump product 258 g. of monofluorotrichloromethane and
790 g. of carbon tetrachloride were obtained.

Example 2

566 g. of trichloroacetyl chloride, 360 g. of hydrogen fluoride and 22 g. of chlorine were led within 6 hours in gaseous condition over a chromium oxifluoride catalyst, prepared according to German Pat. No. 1,252,182. The catalyst was kept in a reaction vessel at a temperature of 240° C. and had a volume of 2 l. 1320 g. of chloroform were added in gas form continuously to the reaction gases leaving the reaction vessel. This gaseous mixture was led at 220° C. again over a fluorination catalyst as described above, which had a volume of 1 l., the reaction mixture obtained was condensed in cooling traps, which were cooled with Dry Ice or liquid air, and the liquid reaction products were rectified.

Thereby in the temperature interval of between −91° and −25° C. at the head and atmospheric pressure 661 g. of hydrogen chloride, together with
    155 g. of trifluoromethane and
    21 g. of trifluoroacetyl fluoride,
    32 g. of difluorochloromethane were obtained:

between −25° and −12° C.

272 g. of trifluoroacetyl chloride, corresponding to a yield of 66% of the theory were obtained.

As sump product 52 g. of monofluorodichloromethane and
949 g. of chloroform are obtained.

Example 3

215 g. of trichloroacetyl chloride, 115 g. of hydrogen fluoride and 7 g. of chlorine were led over the catalyst as in Example (1) within 2 hours at 240° C. After leaving the reaction zone 490 g. of fluorotrichloromethane were mixed with the reaction mixture continuously. The gaseous mixture obtained was passed over the second catalyst at 190° C. as in Example (1). Subsequently the reaction mixture was brought into water whereby the hydrolyzable parts were hydrolyzed.

3 g. of tetrafluoromethane,
66 g. of trifluorochloromethane,
282 g. of difluorodichloromethane,
46 g. of monofluorotrichloromethane, and
35 g. of carbon tetrachloride were obtained as nonhydrolyzable substances.

In the aqueous phase 249 g. of HCl
3 g. of HF
90 g. of $CF_3COOH$ were determined through titration. That means that the gaseous mixture leaving the secondary reactor practically did not contain ionogenic fluorine either as hydrogen or fluoride nor as acid fluoride, i.e. that the trifluoroacetyl fluoride formed in the first reaction had been converted practically completely to trifluoroacetyl chloride and that furthermore the free hydrogen fluoride had reacted completely with the carbon tetrachloride to fluorinated methanes.

We claim:

1. A process for the preparation of trifluoroacetyl chloride by reacting trifluoroacetyl fluoride in the presence of hydrogen chloride and optionally of hydrogen fluoride, wherein a gaseous mixture of trifluoroacetyl fluoride, hydrogen chloride and optionally hydrogen fluoride and a chlorohydrocarbon having 1 to 3 carbon atoms and containing at least two chlorine atoms linked to at least one carbon atom, the molar ratio of said chlorohydrocarbon to hydrogen fluoride and trifluoroacetyl fluoride being from 0.5 to 5, is passed at a temperature of from 100° to 350° C. over a chromium oxyfluoride catalyst obtained by fluorination of a hydrated oxide of trivalent chromium or by heating of hydrous chromium trifluoride in an oxygen or nitrogen stream and the trifluoroacetyl chloride is thereafter isolated from the reaction mixture.

2. A process as claimed in claim 1 wherein the gaseous mixture of trifluoroacetyl fluoride, hydrogen chloride and optionally hydrogen fluoride is obtained by catalytic fluorination of trichloroacetyl chloride with hydrogen fluoride.

3. A process as claimed in claim 1, wherein the chlorohydrocarbon is added in a 0.5 to 3 fold molar quantity.

4. A process as claimed in claim 1, wherein the chlorohydrocarbon is added in a 1 to 2 fold molar quantity.

5. A process as in claim 1 wherein the chlorohydrocarbon is carbon tetrachloride.

6. A process as claimed in claim 1, wherein the reaction is carried out at a temperature of from 170° to 250° C.

References Cited

UNITED STATES PATENTS 3,047,610   7/1962   Brace et al. _____ 260—544 Y

FOREIGN PATENTS 1,056,512   1/1967   Great Britain _____ 260—544 Y
1,020,970  12/1957   Germany _____ 260—544 Y LORRAINE A. WEINBERGER, Primary Examiner R. D. KELLY, Assistant Examiner